(12) United States Patent
Nakane et al.

(10) Patent No.: US 12,434,562 B2
(45) Date of Patent: Oct. 7, 2025

(54) VEHICLE SWITCH ILLUMINATION DEVICE

(71) Applicant: Panasonic Automotive Systems Co., Ltd., Kanagawa (JP)

(72) Inventors: Yusuke Nakane, Fukui (JP); Taisaku Maeda, Fukui (JP); Tatsuya Tsuda, Fukui (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/611,336

(22) Filed: Mar. 20, 2024

(65) Prior Publication Data

US 2024/0329293 A1  Oct. 3, 2024

(30) Foreign Application Priority Data

Mar. 31, 2023 (JP) ................... 2023-059033

(51) Int. Cl.
*B60K 35/10* (2024.01)
*B60K 35/21* (2024.01)
*B60K 35/50* (2024.01)
*F21V 8/00* (2006.01)
*H01H 19/00* (2006.01)

(52) U.S. Cl.
CPC ............ *B60K 35/10* (2024.01); *B60K 35/212* (2024.01); *B60K 35/50* (2024.01); *B60K 2360/126* (2024.01); *B60K 2360/332* (2024.01); *B60K 2360/336* (2024.01); *B60K 2360/6985* (2024.01); *G02B 6/0088* (2013.01); *G02B 6/0091* (2013.01); *H01H 19/00* (2013.01)

(58) Field of Classification Search
CPC ............................ B60K 35/10; B60K 35/212; B60K 2360/126; B60K 2360/225; B60K 2360/322; B60K 2360/6985; G02B 6/0088; G02B 6/0091
USPC ....................................... 362/23.04
See application file for complete search history.

(56) References Cited

U.S. PATENT DOCUMENTS

2003/0079672 A1*  5/2003  Kalashnikov .......... G01D 13/28
                                                             116/288

FOREIGN PATENT DOCUMENTS

EP        1880890 A1 *  1/2008  ............. B60K 35/00
JP        4293059 A      6/2004

* cited by examiner

*Primary Examiner* — Keith G. Delahoussaye
(74) *Attorney, Agent, or Firm* — Seed Intellectual Property Law Group LLP

(57) ABSTRACT

A vehicle switch illumination device includes: a rotator that includes a pointer indicator and is operable by rotation; a first light source; a second light source disposed adjacent to the first light source; and a light guide that includes a light incident surface through which light enters. The light guide guides the light that enters through the light incident surface to the pointer indicator. Furthermore, the light guided by the light guide exits through the pointer indicator. Additionally, the light guide rotates in accordance with rotation of the rotator. Moreover, the rotator rotates the pointer indicator between a first position and a second position to cause at least one of the first light source or the second light source to oppose the light incident surface.

10 Claims, 6 Drawing Sheets

VEHICLE SWITCH ILLUMINATION DEVICE

CROSS REFERENCE TO RELATED APPLICATION

The present application is based on and claims priority of Japanese Patent Application No. 2023-059033 filed on Mar. 31, 2023.

FIELD

The present disclosure relates to a vehicle switch illumination device.

BACKGROUND

Patent Literature (PTL) 1 discloses a pointer indicator provided in an operation knob that is rotatable and an illumination structure that includes a dial-type switch that illuminates a fixed indicator portion provided in the surroundings of the operation knob. Specifically, in the illumination structure that includes the dial-type switch, when the operation knob is operated by rotation to cause the operation knob to turn from a first indicator region toward a second indicator region, a portion of light from a light source that illuminates the second indicator region is guided from a lens component provided in the fixed indicator portion to a lens component provided in the pointer indicator, thereby causing the color of light that exits through the pointer indicator to incrementally change from an illumination color of the first indicator region to an illumination color of the second indicator region.

CITATION LIST

Patent Literature

PTL 1: Japanese Patent No. 4293059

SUMMARY

However, the illumination structure that includes the dial-type switch described in PTL 1 can be improved upon. In view of this, the present disclosure provides a vehicle switch illumination device capable of improving upon the above related art.

A vehicle switch illumination device according to one aspect of the present disclosure includes: a rotator that includes a pointer indicator and is operable by rotation; a first light source; a second light source disposed adjacent to the first light source; and a light guide that includes a light incident surface through which light enters. The light guide guides the light that enters through the light incident surface to the pointer indicator. The light guided by the light guide exits through the pointer indicator, the light guide rotates in accordance with rotation of the rotator, and the rotator rotates the pointer indicator between a first position and a second position to cause at least one of the first light source or the second light source to oppose the light incident surface.

The vehicle switch illumination device according to the present disclosure is capable of further improving upon the above related art.

BRIEF DESCRIPTION OF DRAWINGS

These and other advantages and features of the present disclosure will become apparent from the following description thereof taken in conjunction with the accompanying drawings that illustrate specific embodiments of the present disclosure.

FIG. 7 is a plan view of a vehicle switch illumination device according to another embodiment and the like.

DESCRIPTION OF EMBODIMENTS

It should be noted that the embodiments described below merely illustrate general or specific examples of the present disclosure. The numerical values, shapes, materials, elements, the arrangement and connection states of the elements, steps, the order of the steps, etc., described in the following embodiments are mere examples, and are therefore not intended to limit the present disclosure. Accordingly, among elements in the following embodiments, those not appearing in any of the independent claims will be described as optional elements.

It should be noted that the figures are schematic diagrams and are not necessarily precise illustrations. In the figures, elements that are essentially the same are given the same reference numbers.

Furthermore, in the following embodiments, expressions, such as "disc-shaped", "substantially rectangular", "radial direction", and the like are used. For example, "disc-shaped", "substantially rectangular", or "radial direction" not only mean exactly disc-shaped, exactly rectangular, or an exact radial direction, but also mean essentially disc-shaped, essentially rectangular, or an essentially radial direction, i.e., so that their meaning includes an error of approximately several percent. In addition, "disc-shaped", "substantially rectangular", or "radial direction" mean being disc-shaped, being rectangular, or a direction that is radial to an extent that the advantageous effects of the present disclosure can be achieved. The same applies to other expressions using "shaped", "substantially", or "direction".

Embodiment

<Configuration>

In the present embodiment, vehicle switch illumination device 1 will be described with reference to FIG. 1 through FIG. 4.

Figure 1:
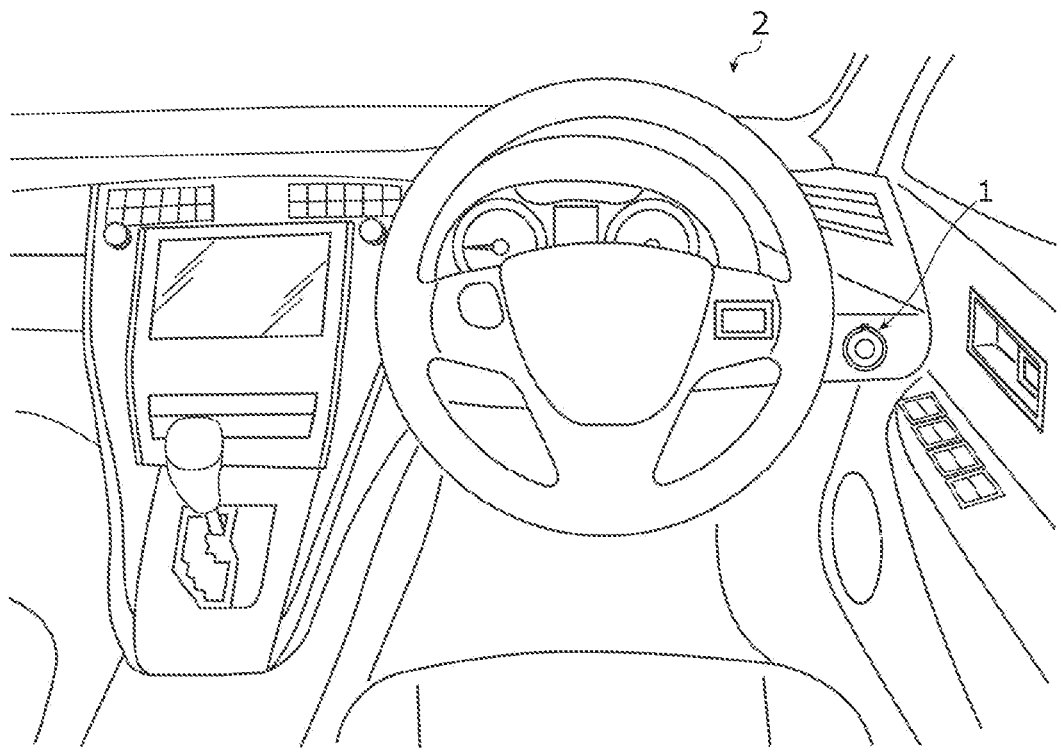
FIG. 1 is a diagram illustrating a cabin of a vehicle in which a vehicle switch illumination device according to an embodiment is provided.
Figure 2:
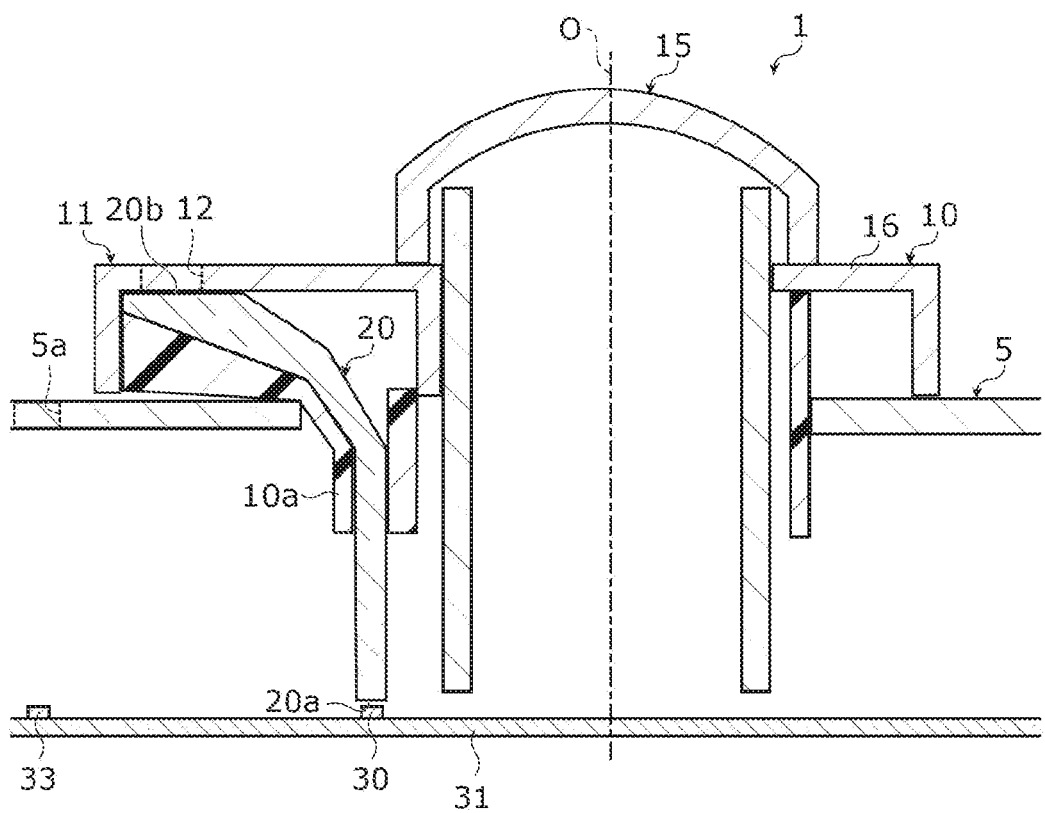
FIG. 2 is a cross-sectional view of the vehicle switch illumination device according to the embodiment.
Figure 3:
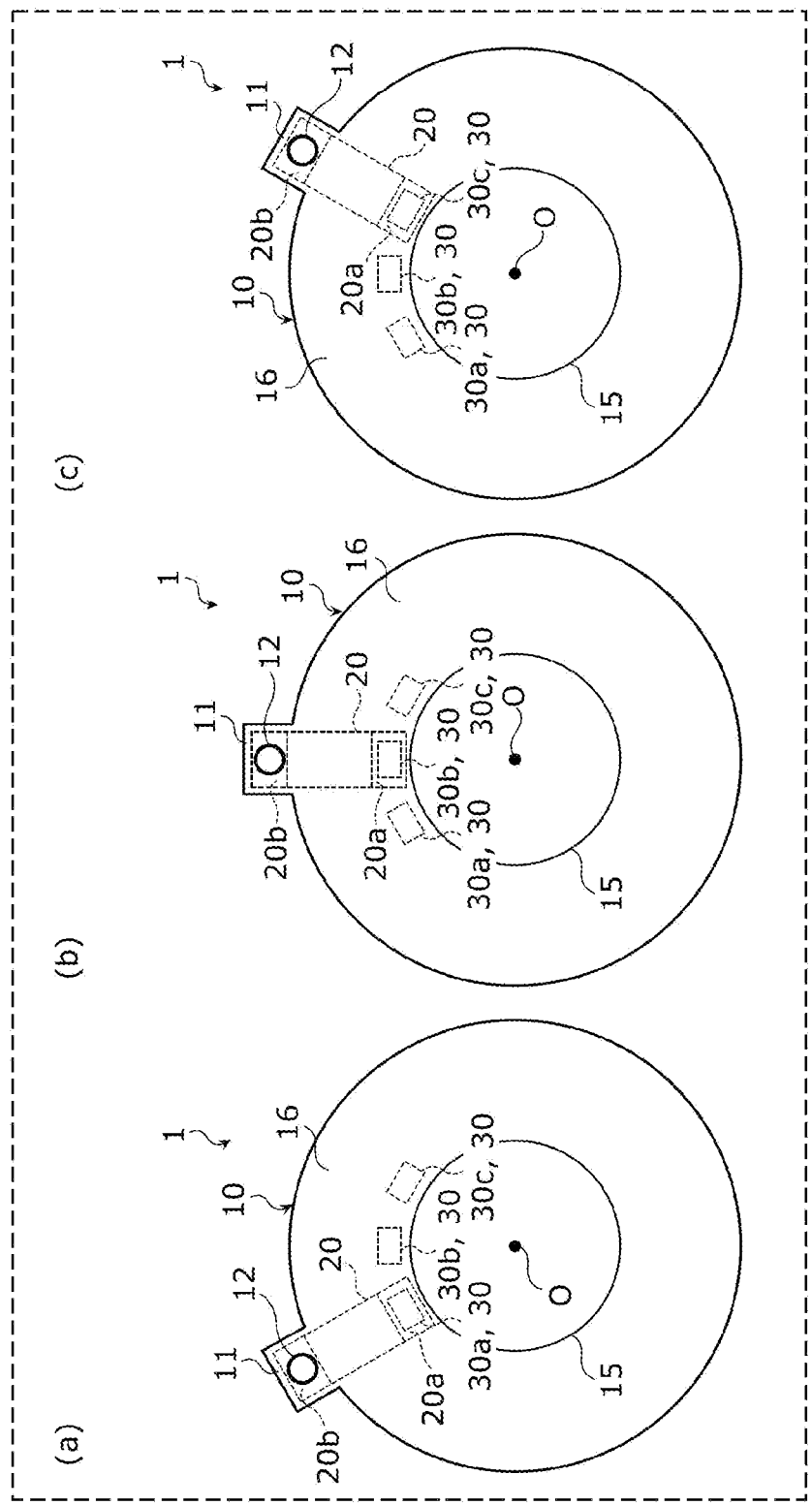
FIG. 3 is a plan view of the vehicle switch illumination device according to the embodiment.
Figure 4:
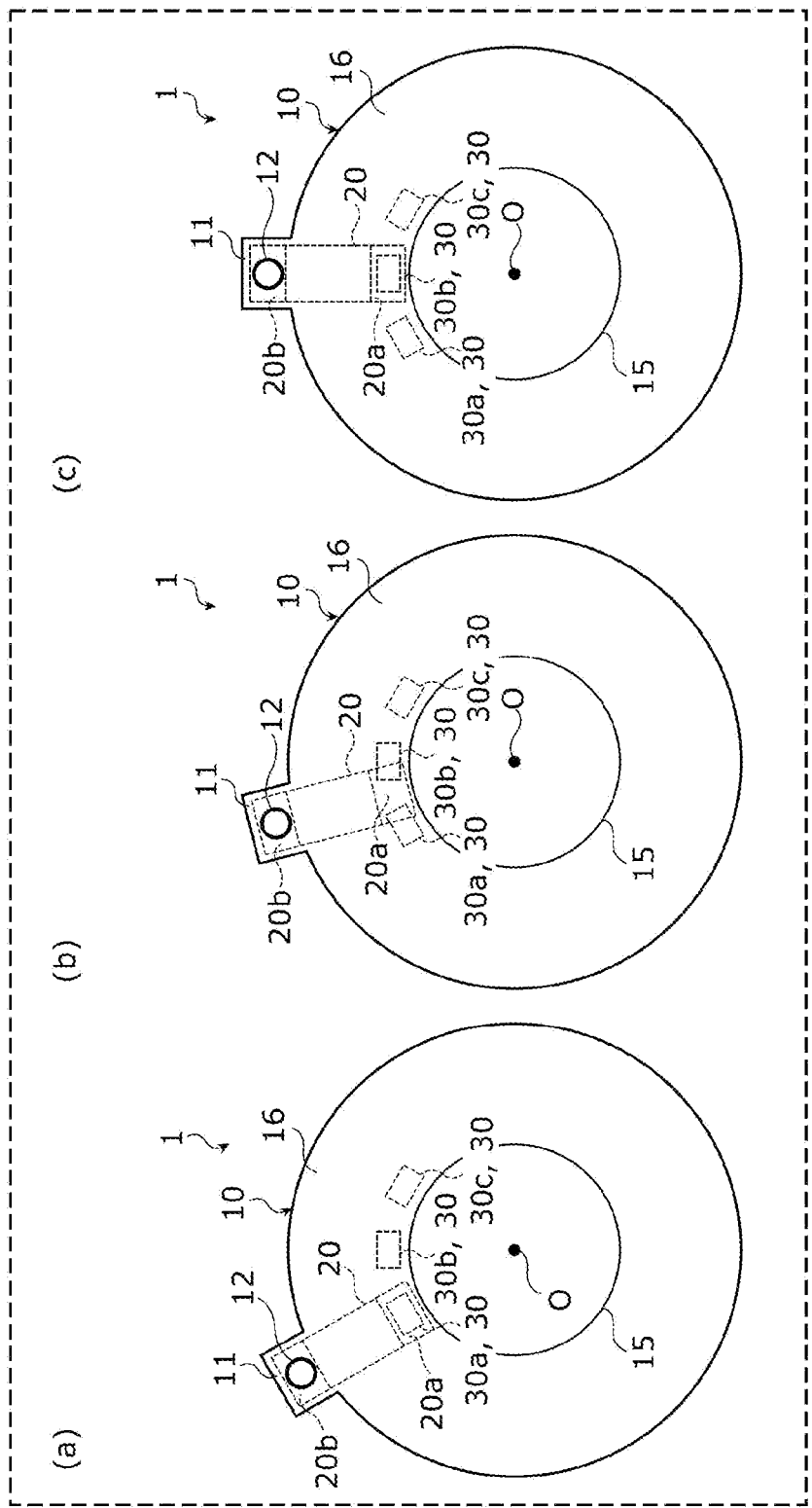
FIG. 4 is another plan view of the vehicle switch illumination device according to the embodiment.

FIG. 1 is a diagram illustrating a cabin of a vehicle in which vehicle switch illumination device 1 according to the embodiment is provided. FIG. 2 is a cross-sectional view of vehicle switch illumination device 1 according to the embodiment. FIG. 3 is a plan view of vehicle switch illumination device 1 according to the embodiment. FIG. 4 is another plan view of vehicle switch illumination device 1 according to the embodiment.

As illustrated in FIG. 1, vehicle switch illumination device 1 according to the present embodiment is used to switch between drive modes that include a four-wheel drive mode and a two-wheel drive mode, for example. It should be noted that vehicle switch illumination device 1 may be used to adjust the temperature settings and the air volume level, for example, of an air conditioning device provided in vehicle 2, or may be used to adjust the sound volume level and the selected music track, for example, of an audio device provided in vehicle 2.

Vehicle switch illumination device 1 is provided in fixed portion 5 in an instrument panel, or the like, near a steering wheel, for example. Vehicle switch illumination device 1 is embedded in and fixed to the instrument panel.

As illustrated in FIG. 1 and FIG. 2, vehicle switch illumination device 1 includes rotator 10, light guide 20, a plurality of light sources 30, and substrate 31.

Rotator 10 is a disc-shaped rotatable knob that can be operated by rotation. Rotator 10 can be gripped by a person's hand and rotated. This causes rotator 10 to rotate about center of rotation O relative to fixed portion 5.

Furthermore, in the present embodiment, cap 15 is provided in a central portion of rotator 10. Cap 15 may be used as a push button, and alternatively, cap 15 need not be used as a push button. When cap 15 is a push button, a person can operate a device provided in vehicle 2 by pressing and operating cap 15. When cap 15 is not used as a push button, a person can operate a device provided in vehicle 2 by rotating and operating cap 15, thereby rotating rotator 10 together with cap 15.

Rotator 10 includes disc-shaped main body 16 and pointer 11 that projects in a radial direction from main body 16. Main body 16 can be gripped by a person's fingers to rotate rotator 10. Pointer 11 is a finger grip, and pointer 11 can be gripped by a person's fingers to rotate rotator 10. Pointer 11 points out which fixed indicator portion 5a, from among a plurality of fixed indicator portions 5a provided in fixed portion 5, is being indicated. For example, pointer 11 points out whether the drive mode is set to the four-wheel drive mode or the two-wheel drive mode.

Pointer indicator 12 is provided in pointer 11. That is to say, rotator 10 includes pointer indicator 12, and pointer indicator 12 is provided in rotator 10. Since pointer indicator 12 is provided in pointer 11, pointer indicator 12 is disposed outside of main body 16 of rotator 10.

Since light guided by light guide 20 exits through pointer indicator 12, the color cast by the light can be displayed in pointer indicator 12. For example, pointer indicator 12 may be a light-transmissive component through which the light guided by light guide 20 enters, so that the light that has entered can be caused to exit therefrom. Furthermore, pointer indicator 12 may, for example, be a penetrating hole through which the light guided by light guide 20 passes through.

Since light emitted by at least one light source 30, from among the plurality of light sources 30, enters light incident surface 20a, light guide 20 can guide the light that enters to pointer indicator 12. For example, when at least two light sources including a first light source and a second light source are used as light sources 30, light guide 20 includes light incident surface 20a through which light emitted by at least one of the first light source or the second light source enters, and the light that enters light incident surface 20a is guided to pointer indicator 12. Furthermore, light guide 20 according to the present embodiment is in a bent columnar shape and can guide the light that enters light guide 20 from light incident surface 20a to pointer indicator 12 by causing the light that enters to be totally internally reflected.

Light guide 20 includes light incident surface 20a and light exit surface 20b.

Light incident surface 20a is a surface opposing at least one of the plurality of light sources 30, and is a surface through which light emitted by at least one of the plurality of light sources 30 enters. Light incident surface 20a is, for example, polygonal or circular in shape. In the present embodiment, light incident surface 20a is substantially rectangular in shape.

Light exit surface 20b is a surface that opposes pointer indicator 12, and the light that enters light incident surface 20a and is guided by light guide 20 exits through this surface. Light exit surface 20b is, for example, polygonal or circular in shape.

Light guide 20 is disposed so as to span across main body 16 of rotator 10 to pointer 11 of rotator 10. Light guide 20 is fixed to rotary indicator portion 10a that is coupled to rotator 10. Accordingly, light guide 20 rotates about center of rotation O in accordance with the rotation of rotator 10. Specifically, light guide 20 rotates about center of rotation O of rotator 10 along with the rotation of rotator 10. Light guide 20 is positioned such that light incident surface 20a opposes at least one of the plurality of light sources 30 and light exit surface 20b opposes pointer indicator 12, even when light guide 20 is rotated about center of rotation O of rotator 10.

The plurality of light sources 30 are mounted, at predetermined intervals, in a single line or multiple lines on a mounting surface of substrate 31. Each of the plurality of light sources 30 is, for example, a light-emitting diode (LED) module.

In the present embodiment, as illustrated in FIG. 3, first light source 30a, second light source 30b, and third light source 30c are shown as an example of the plurality of light sources 30. It should be noted that vehicle switch illumination device 1 may also include two light sources 30 or four or more light sources 30 as the plurality of light sources 30.

First light source 30a, second light source 30b, and third light source 30c each emit light. Accordingly, first light source 30a, second light source 30b, and third light source 30c can cause light to enter light incident surface 20a of light guide 20.

Second light source 30b is disposed between first light source 30a and third light source 30c. First light source 30a, second light source 30b, and third light source 30c are arranged side by side. In the present embodiment, first light source 30a, second light source 30b, and third light source 30c are disposed along a circle that is defined by center of rotation O.

Each of the plurality of light sources 30 includes a light-emitting element that is an LED chip and a fluorescent substance that emits fluorescent light resulting from wavelength conversion of light emitted by the light-emitting element. The light-emitting element is, for example, a red-light LED chip that emits red light, a blue-light LED chip that emits blue light, or a green-light LED chip that emits green light. The light-emitting element is an LED chip disposed inside of a resin-molded cavity, and emits light that serves as a display color of vehicle switch illumination device 1. The light-emitting element is encapsulated by a sealing component that contains the fluorescent substance within the cavity.

The color of light emitted by first light source 30a and the color of light emitted by second light source 30b are different colors. In the present embodiment, the color of the light emitted by first light source 30a, the color of the light emitted by second light source 30b, and the color of light emitted by third light source 30c are each a different color. For example, a red-light LED chip, a blue-light LED chip, and a green-light LED chip may each be arranged in the mounting surface of substrate 31 in an arbitrary combination, such that two adjacent light sources 30 emit different colors of light. For example, the color of the light emitted by first light source 30a may be red, the color of the light emitted by second light source 30b may be yellow, and the color of the light emitted by third light source 30c may be blue. Since the respective colors of light emitted by first light source 30a, second light source 30b, and third light source 30c are merely given as an example, the present disclosure is not limited to this example.

Furthermore, each of the plurality of light sources 30 may have a different color temperature. For example, each of the plurality of light sources 30 may be arranged in the mounting surface of substrate 31 to cause the color temperatures of the colors of light emitted to progressively increase or decrease.

As illustrated in FIG. 2 and FIG. 3, substrate 31 is disposed such that the mounting surface opposes light guide 20, fixed portion 5, and the like. Substrate 31 is substantially rectangular and board-shaped, and is configured as a ceramic substrate, a resin substrate, a metal-based substrate, or the like.

Substrate 31 includes electrode terminals and metal wiring provided in a predetermined pattern. The electrode terminals are provided for receiving direct-current power from a power supply device for causing the plurality of light sources 30 to emit light. Although the power supply device will not be described in detail, the power supply device steps down electric power from a vehicle battery to an appropriate voltage, and supplies the electric power to light sources 30, for example. The metal wiring in the predetermined pattern is provided for electrically connecting the plurality of light sources 30.

Furthermore, in substrate 31, each of the plurality of light sources 33 is disposed in a position opposing a corresponding one of each of the plurality of fixed indicator portions 5a. Each of the plurality of light sources 33 can emit light toward the corresponding one of each of the plurality of fixed indicator portions 5a.

Note that an example is illustrated where pointer indicator 12 is located in a first position in (a) in FIG. 3, pointer indicator 12 is located in a second position in (b) in FIG. 3, and pointer indicator 12 is located in a third position in (c) in FIG. 3.

With vehicle switch illumination device 1, as illustrated in FIG. 4, for example, when pointer indicator 12 is rotated from the first position to the second position, rotator 10 rotates pointer indicator 12 between the first position and the second position so as to cause at least one of first light source 30a or second light source 30b to oppose light incident surface 20a. Here, by rotating rotator 10, the color cast by the light can be displayed in pointer indicator 12, as described below.

Specifically, as illustrated in (a) in FIG. 4, when a person rotates rotator 10, thereby causing pointer indicator 12 to be located in the first position, light guide 20 is positioned such that light incident surface 20a opposes first light source 30a. Here, when light incident surface 20a of light guide 20 and first light source 30a are viewed in an overlapping manner, light incident surface 20a is positioned so as to cover first light source 30a. As a result, the light emitted by first light source 30a enters light incident surface 20a. Accordingly, since the light emitted by first light source 30a and guided by light guide 20 exits through pointer indicator 12, the color cast by the light emitted by first light source 30a can be displayed in pointer indicator 12.

Furthermore, as illustrated in (b) in FIG. 4, when a person rotates rotator 10, thereby causing pointer indicator 12 to be located between the first position and the second position, light guide 20 is positioned such that light incident surface 20a opposes first light source 30a and second light source 30b. Here, when light incident surface 20a of light guide 20, first light source 30a, and second light source 30b are viewed in an overlapping manner, light incident surface 20a is positioned so as to cover a portion of first light source 30a and a portion of second light source 30b. Accordingly, the light emitted by first light source 30a and the light emitted by second light source 30b enter light incident surface 20a. With this, since the light emitted by first light source 30a and the light emitted by second light source 30b, which are guided by light guide 20, blend with each other and exit through pointer indicator 12, the blend of the two lights and the color cast by the two lights can be displayed in pointer indicator 12.

Furthermore, as illustrated in (c) in FIG. 4, when a person rotates rotator 10, thereby causing pointer indicator 12 to be located in the second position, light guide 20 is positioned such that light incident surface 20a opposes second light source 30b. Here, when light incident surface 20a of light guide 20 and second light source 30b are viewed in an overlapping manner, light incident surface 20a is positioned so as to cover second light source 30b. As a result, the light emitted by second light source 30b enters light incident surface 20a. Accordingly, since the light emitted by second light source 30b and guided by light guide 20 exits through pointer indicator 12, the color cast by the light emitted by second light source 30b can be displayed in pointer indicator 12.

Note that for cases including a case where pointer indicator 12 is located in the first position, a case where pointer indicator 12 is located between the first position and the second position, and a case where pointer indicator 12 is located in the second position, the amount of light that enters light incident surface 20a in each of the cases may be the same. Accordingly, the distance between two adjacent light sources 30 from among the plurality of light sources 30 may be shorter than the width of light incident surface 20a in a circumferential direction along a virtual circle defined by the path in which light guide 20 rotates (trajectory of rotation) about center of rotation O. With this configuration, when the plurality of light sources 30 and light incident surface 20a are viewed in an overlapping manner, since light incident surface 20a overlaps at least one light source 30 from among the plurality of light sources 30, the amount of light that enters light incident surface 20a can be expected to remain the same regardless of the position of light guide 20.

<Functions and Effects>

Next, the functions and effects of vehicle switch illumination device 1 according to the present embodiment will be described.

For example, in the illumination structure that includes the dial-type switch described in PTL 1, the pointer indicator provided in the operation knob remains illuminated due to light received from a first light source, and the pointer indicator incrementally receives light from a second light source due to the operation knob being operated by rotation, thereby causing a display color of the pointer indicator to progressively approach a display color of the fixed indicator portion. However, since the pointer indicator is configured to continue receiving light from the first light source, the brightness of the light displayed in the pointer indicator increases as the pointer indicator progressively receives more and more light from the second light source. Furthermore, since the pointer indicator continues to receive light from the first light source, it is problematic that the degree of freedom to which the display color can be adjusted is low. In view of this, as described above, vehicle switch illumination device 1 according to the present embodiment includes rotatably operable rotator 10 in which pointer indicator 12 is provided, first light source 30a, second light source 30b that is disposed adjacent to first light source 30a, and light guide 20 that includes light incident surface 20a through which light enters and guides the light that enters through light incident surface 20a to pointer indicator 12. Furthermore, light that is guided by light guide 20 exits through pointer indicator 12. Additionally, light guide 20 rotates in accordance with the rotation of rotator 10. Moreover, rotator 10 rotates pointer indicator 12 from the first position to the second position so as to cause at least one of first light source 30a or second light source 30b to oppose light incident surface 20a.

Accordingly, light incident surface 20a is positioned so as to oppose at least one of first light source 30a or second light source 30b, even when light guide 20 is rotated in accordance with the rotation of rotator 10. For this reason, since the amount of light that enters light incident surface 20a can be ensured to remain steady, the brightness of the light that exits through pointer indicator 12 remains the same regardless of how light guide 20 is rotated by rotator 10.

Furthermore, since the position of light incident surface 20a of light guide 20 changes due to the rotation of rotator 10, light emitted by at least one of first light source 30a or second light source 30b enters light incident surface 20a. Accordingly, since light from one or more specific light sources 30 continues to enter light incident surface 20a, the degree of freedom to which the light guided to pointer indicator 12 can be adjusted is less prone to becoming limited.

Consequently, the brightness of the display color of the light that exits through pointer indicator 12 can be made constant, and the degree of freedom to which the display light can be adjusted can be improved.

Furthermore, in vehicle switch illumination device 1 according to the present embodiment, when pointer indicator 12 is located in the first position, light guide 20 is positioned such that light incident surface 20a opposes first light source 30a. Additionally, when pointer indicator 12 is located between the first position and the second position, light guide 20 is positioned such that light incident surface 20a opposes first light source 30a and second light source 30b. Moreover, when pointer indicator 12 is located in the second position, light guide 20 is positioned such that light incident surface 20a opposes second light source 30b.

Accordingly, when pointer indicator 12 is located in the first position, the light from first light source 30a is guided to pointer indicator 12. When pointer indicator 12 is located between the first position and the second position, the light from first light source 30a and the light from second light source 30b are guided to pointer indicator 12. Furthermore, when pointer indicator 12 is located in the second position, the light from second light source 30b is guided to pointer indicator 12. Accordingly, since the light that exits through pointer indicator 12 can be changed by simply rotating rotator 10 and adjusting the position of light incident surface 20a relative to each light source 30, the degree of freedom to which the display light can be adjusted can be improved.

Furthermore, in vehicle switch illumination device 1 according to the present embodiment, the color of the light emitted by first light source 30a and the color of the light emitted by second light source 30b are different colors.

Accordingly, when pointer indicator 12 is moved from the first position to the second position by rotating rotator 10, for example, the light emitted by first light source 30a and the light emitted by second light source 30b blend together and enter light incident surface 20a. Accordingly, it is possible to progressively change the color of the light that exits through pointer indicator 12 in a gradated manner from the color of the light emitted by first light source 30a to the color of the light emitted by second light source 30b. Furthermore, when pointer indicator 12 is at the first position, the light and the color of the light emitted by first light source 30a are displayed in pointer indicator 12, and when pointer indicator 12 is at the second position, the light and the color of the light emitted by second light source 30b are displayed in pointer indicator 12. Accordingly, since the color of the light that exits through pointer indicator 12 can be changed by simply rotating rotator 10 and adjusting the position of light incident surface 20a, the degree of freedom to which the color of the display light can be adjusted can be improved.

Variation of Embodiment

In the present variation, vehicle switch illumination device 1a will be described with reference to FIG. 5 and FIG. 6.

Figure 5:
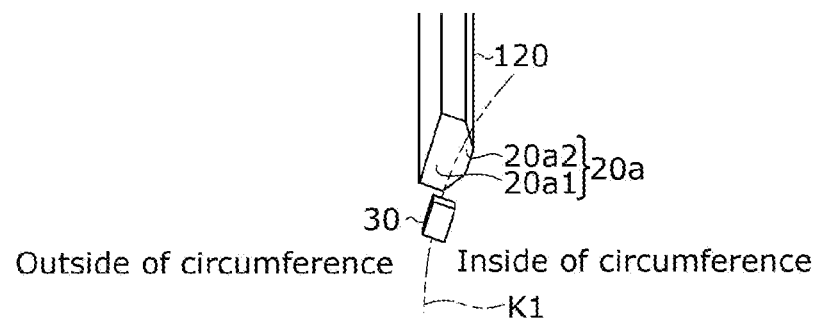
FIG. 5 is a perspective view of a light guide and a light source of a vehicle switch illumination device according to a variation of the embodiment.

FIG. 5 is a perspective view of light guide 120 and light source 30 of vehicle switch illumination device 1a according to a variation of the embodiment. FIG. 6 is a diagram illustrating the relationship between the path of light incident surface 20a and positions of light sources 30 of vehicle switch illumination device 1a according to the variation of the embodiment. Note that in (a) in FIG. 6, an example is illustrated where pointer indicator 12 is located in a first position, while in (b) in FIG. 6, pointer indicator 12 is located between the first position and a second position, and in (c) in FIG. 6, pointer indicator 12 is located in the second position. In FIG. 6, in order to avoid complicating the figure, the configuration of elements other than light sources 30 and light incident surface 20a is omitted.

The present variation differs from the vehicle switch illumination device according to the above-mentioned embodiment with respect to the shape of light incident surface 20a of light guide 120, which is a shape different from the shape of the light guide according to the above-mentioned embodiment. In the present variation, elements having configurations and functions that are essentially the same as those in the above-mentioned embodiment are given the same reference signs, and detailed descriptions of such configurations and functions will be omitted. It should be noted that the following will focus on the points of difference with the vehicle switch illumination device according to the above-mentioned embodiment.

In the present variation, as illustrated in FIG. 5, light incident surface 20a of light guide 120 is shaped such that the shape of a portion of light incident surface 20a located inside of the circumference of virtual circle K1, which is indicated by the two-dot chain line and defined by the path in which light guide 120 rotates, is different from the shape of a portion of light incident surface 20a located outside of the circumference of virtual circle K1. Specifically, light incident surface 20a of light guide 120 includes first surface 20a1 and second surface 20a2 that is continuous with first surface 20a1 and tapered relative to the shape of first surface 20a1. First surface 20a1 is polygonal or circular in shape. Second surface 20a2 is polygonal or circular in shape. In the present variation, first surface 20a1 is substantially rectangular in shape, and second surface 20a2 is trapezoidal in shape. In the present variation, the long side of second surface 20a2 is in contact with one side of first surface 20a1, and second surface 20a2 is disposed so as to project out from the one side of first surface 20a1 in a tapered manner.

Figure 6:
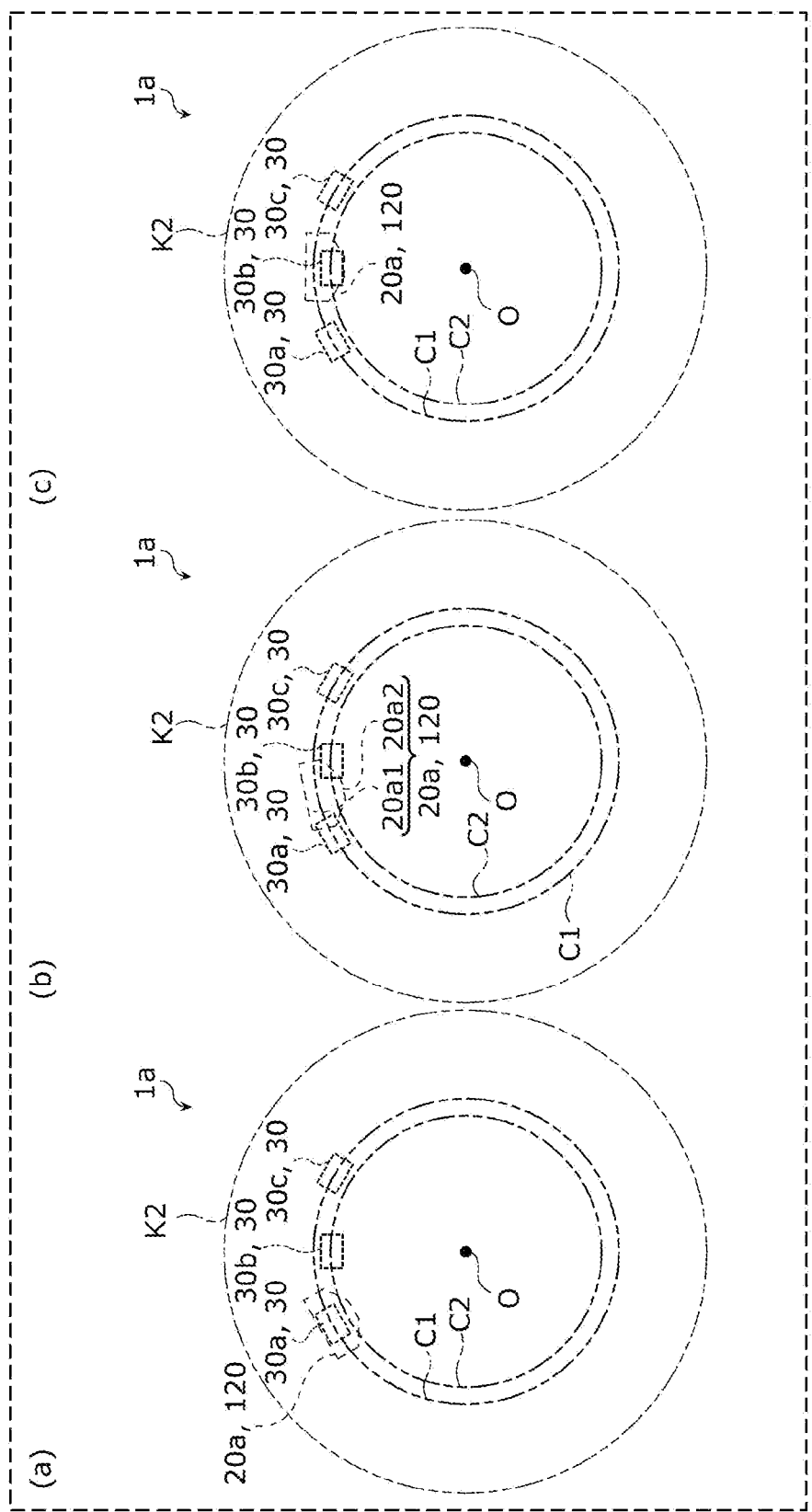
FIG. 6 is a diagram illustrating the relationship between the path of a light incident surface and positions of light sources of the vehicle switch illumination device according to the variation of the embodiment.

Furthermore, in the present variation, as illustrated in FIG. 6, when light incident surface 20a and the plurality of light sources 30 are viewed in an overlapping manner, first surface 20a1 is disposed outside of the circumference of virtual circle K1 of FIG. 5 that is defined by the path in which light guide 120 rotates, and second surface 20a2 is disposed inside of the circumference of virtual circle K1. Here, first surface 20a1 rotates along first circle C1 in accordance with the rotation of rotator 10. Furthermore, second surface 20a2 rotates along second circle C2 in accordance with the rotation of rotator 10.

It should be noted that first surface 20a1 may be disposed inside of the circumference of virtual circle K1 and second surface 20a2 may be disposed outside of the circumference of virtual circle K1.

Furthermore, the plurality of light sources 30, that is to say, first light source 30a, second light source 30b, and third light source 30c are disposed inside of the circumference of virtual circle K2 that is defined by the path in which pointer indicator 12 rotates. First light source 30a is disposed along first circle C1 that is defined by center of rotation O about which light guide 120 rotates. Furthermore, second light source 30b is disposed on second circle C2 that is defined by center of rotation O about which light guide 120 rotates and has a radius that is different from the radius of first circle C1. Additionally, third light source 30c is disposed on first circle C1 or second circle C2, which are defined by center of rotation O about which light guide 120 rotates. Moreover, center of rotation O of light guide 120 is the same as center of rotation O of rotator 10. In FIG. 6, although an example is illustrated where first circle C1 is defined as being located outside of the circumference of second circle C2, the example in FIG. 6 is not limiting.

It should be noted that the plurality of light sources 30 need not be disposed in an alternating manner on first circle C1 and on second circle C2 as in the present variation. The plurality of light sources 30 may be arranged randomly on first circle C1 and on second circle C2, or may be arranged in accordance with a predetermined rule.

In the case of a configuration like that of the present variation, the present variation from differs the above-mentioned embodiment with respect to the light that enters light incident surface 20a that is determined by the position of pointer indicator 12.

For example, in a case where the light incident surface is substantially rectangular, when the light incident surface is positioned at a central position between the first light source and the second light source such that the light incident surface straddles the first light source and the second light source, as shown in (b) in FIG. 4, since the light from the first light source and the light from the second light source enter the light incident surface, the color of the light displayed in the pointer indicator becomes an intermediate color. However, in (b) in FIG. 6 of the present variation, light guide 120 is provided in a shape that is partially tapered. Accordingly, when light incident surface 20a is positioned at the central position between first light source 30a and second light source 30b such that light incident surface 20a straddles first light source 30a and second light source 30b, the position at which the light from second light source 30b enters light incident surface 20a becomes off center. That is to say, when light incident surface 20a is positioned closer to second light source 30b relative to the central position, the color of the light displayed in pointer indicator 12 becomes an intermediate color. Furthermore, since light guide 120 is provided in a shape that is partially tapered, the region through which the light emitted by second light source 30b enters becomes smaller, thereby shortening the duration of time during which the light emitted by second light source 30b enters light incident surface 20a.

In the present variation, by rotating rotator 10, a color cast by light can be displayed in pointer indicator 12, as described below.

Specifically, when pointer indicator 12 is located in the first position as illustrated in (a) in FIG. 6, in the same manner as in (a) in FIG. 4, the light emitted by first light source 30a enters light incident surface 20a. Accordingly, since the light emitted by first light source 30a and guided by light guide 120 exits through pointer indicator 12, the color cast by the light emitted by first light source 30a can be displayed in pointer indicator 12.

Furthermore, as illustrated in (b) in FIG. 6, when pointer indicator 12 is located between the first position and the second position, light guide 120 is positioned such that light incident surface 20a opposes first light source 30a and second light source 30b. Here, when light incident surface 20a of light guide 120, first light source 30a, and second light source 30b are viewed in an overlapping manner, first surface 20a1 is positioned so as to cover a portion of first light source 30a, and second surface 20a2 is positioned so as to cover a portion of second light source 30b. Accordingly, the light emitted by first light source 30a primarily enters first surface 20a1, and the light emitted by second light source 30b primarily enters second surface 20a2. With this, since the light emitted by first light source 30a and the light emitted by second light source 30b, which are guided by light guide 120, blend with each other and exit through pointer indicator 12, the blend of the two lights and the color cast by the two lights can be displayed in pointer indicator 12.

Furthermore, as illustrated in (c) in FIG. 6, when pointer indicator 12 is located in the second position, in the same manner as in (c) in FIG. 4, the light emitted by second light source 30b enters light incident surface 20a. Accordingly, since the light emitted by second light source 30b and guided by light guide 120 exits through pointer indicator 12, the color cast by the light emitted by second light source 30b can be displayed in pointer indicator 12.

The functions and effects achieved by vehicle switch illumination device 1a according to the present variation will be described.

As described above, in vehicle switch illumination device 1a according to the present variation, light incident surface 20a includes first surface 20a1 and second surface 20a2 that is continuous with first surface 20a1 and tapered relative to the shape of first surface 20a1.

Accordingly, since second surface 20a2 is tapered, when rotator 10 is rotated, the amount of light from first light source 30a that enters second surface 20a2 gently increases or decreases, and the amount of light from second light source 30b that enters second surface 20a2 gently decreases or increases. Accordingly, in second surface 20a2, the extent to which the amount of light from first light source 30a and the amount of light from second light source 30b increases and decreases is small. Furthermore, in first surface 20a1, the extent to which the amount of light from first light source 30a and the amount of light from second light source 30b increases and decreases is large compared to second surface 20a2. Accordingly, the color of the light guided to pointer indicator 12 can be more readily adjusted compared to a case where the color of the light is monotonically adjusted. As a result, the manner in which the color of the light displayed in pointer indicator 12 is switched can be more readily adjusted.

Furthermore, in vehicle switch illumination device 1a according to the present variation, light incident surface 20a is shaped such that the shape of the portion of light incident surface 20a located inside of the circumference of virtual circle K1, which is defined by the path in which light guide 120 rotates, is different from the shape of the portion of light incident surface 20a located outside of the circumference of virtual circle K1.

Accordingly, since the portion of light incident surface 20a located inside of the circumference of virtual circle K1 and the portion of light incident surface 20a located outside of the circumference of virtual circle K1 are shaped differently, the extent to which the amount of light from first light source 30a and the amount of light from second light source 30b increases or decreases in second surface 20a2, when rotator 10 is rotated, is small. Furthermore, the extent to which the amount of light from first light source 30a and the amount of light from second light source 30b increases or decreases in first surface 20a1 is large compared to second surface 20a2. Accordingly, the color of the light guided to pointer indicator 12 can be more readily adjusted compared to a case where the color of the light is monotonically adjusted. As a result, the manner in which the color of the light displayed in pointer indicator 12 is switched can be more readily adjusted.

Furthermore, in vehicle switch illumination device 1a according to the present variation, first light source 30a is disposed along first circle C1 that is defined by center of rotation O about which light guide 120 rotates. Furthermore, second light source 30b is disposed on second circle C2 that is defined by center of rotation O about which light guide 120 rotates and has a radius that is different from the radius of first circle C1.

For example, in a case where the light incident surface is rectangular or the like, and the pointer indicator is moved from the first position to the second position by rotating the rotator, the amount of light from the first light source that enters the light incident surface progressively decreases, while the amount of light from the second light source that enters the light incident surface progressively increases, thereby causing the color of the light guided to the pointer indicator to change monotonically.

However, according to the present variation, since first light source 30a and second light source 30b can be disposed along circle C1 and circle C2 that have different radii, when rotator 10 is rotated, in second surface 20a2 in FIG. 6, for example, the region in which the light emitted by second light source 30b enters becomes smaller, thereby shortening the duration of time during which the light emitted by second light source 30b enters light incident surface 20a. Accordingly, the extent to which the amount of light from first light source 30a and the amount of light from second light source 30b that enters light incident surface 20a increases or decreases can be more readily adjusted. As a result, the color of the light guided to pointer indicator 12 changes dramatically. For this reason, the manner in which the color of the light displayed in pointer indicator 12 is switched can be more widely adjusted.

Furthermore, in vehicle switch illumination device 1a according to the present variation, first light source 30a is disposed along first circle C1 that is defined by center of rotation O about which light guide 120 rotates. Additionally, second light source 30b is disposed on second circle C2 that is defined by center of rotation O about which light guide 120 rotates and has a radius that is different from the radius of first circle C1. Furthermore, first surface 20a1 rotates along first circle C1 in accordance with the rotation of rotator 10. Moreover, second surface 20a2 rotates along second circle C2 in accordance with the rotation of rotator 10.

Accordingly, the light emitted by first light source 30a primarily enters first surface 20a1, and the light emitted by second light source 30b primarily enters second surface 20a2. Accordingly, the extent to which the amount of light from first light source 30a and the amount of light from second light source 30b that enters light incident surface 20a increases or decreases can be more readily adjusted. As a result, the color of the light guided to pointer indicator 12 changes dramatically. For this reason, the manner in which the color of the light displayed in pointer indicator 12 is switched can be more widely adjusted.

Furthermore, in vehicle switch illumination device 1a according to the present variation, first light source 30a and second light source 30b are disposed inside of the circumference of virtual circle K2 that is defined by the path in which pointer indicator 12 rotates.

Accordingly, since the distance between first light source 30a and second light source 30b can be prevented from becoming large, and since light incident surface 20a of light guide 120 can be prevented from having a large area, light guide 120 can be prevented from increasing in size. As a result, the manufacturing cost of light guide 120 can be prevented from increasing.

Other Embodiment, Etc

Although the vehicle switch illumination devices according to the present disclosure are described above based on the above-mentioned embodiment and the variation of the embodiment, the present disclosure is not limited to the above-mentioned embodiment and the variation of the embodiment.

For example, in the variation of the embodiment, the width of the first surface in a radial direction of the center of rotation and the width of the second surface in the radial direction of the center of rotation may be substantially the same. Furthermore, the area of the first surface and the area of the second surface may be substantially the same or may be different. Additionally, the respective widths of the first surface and the second surface in the radial direction of the center of rotation may each be larger than the respective widths of the light sources in the radial direction.

Figure 7:
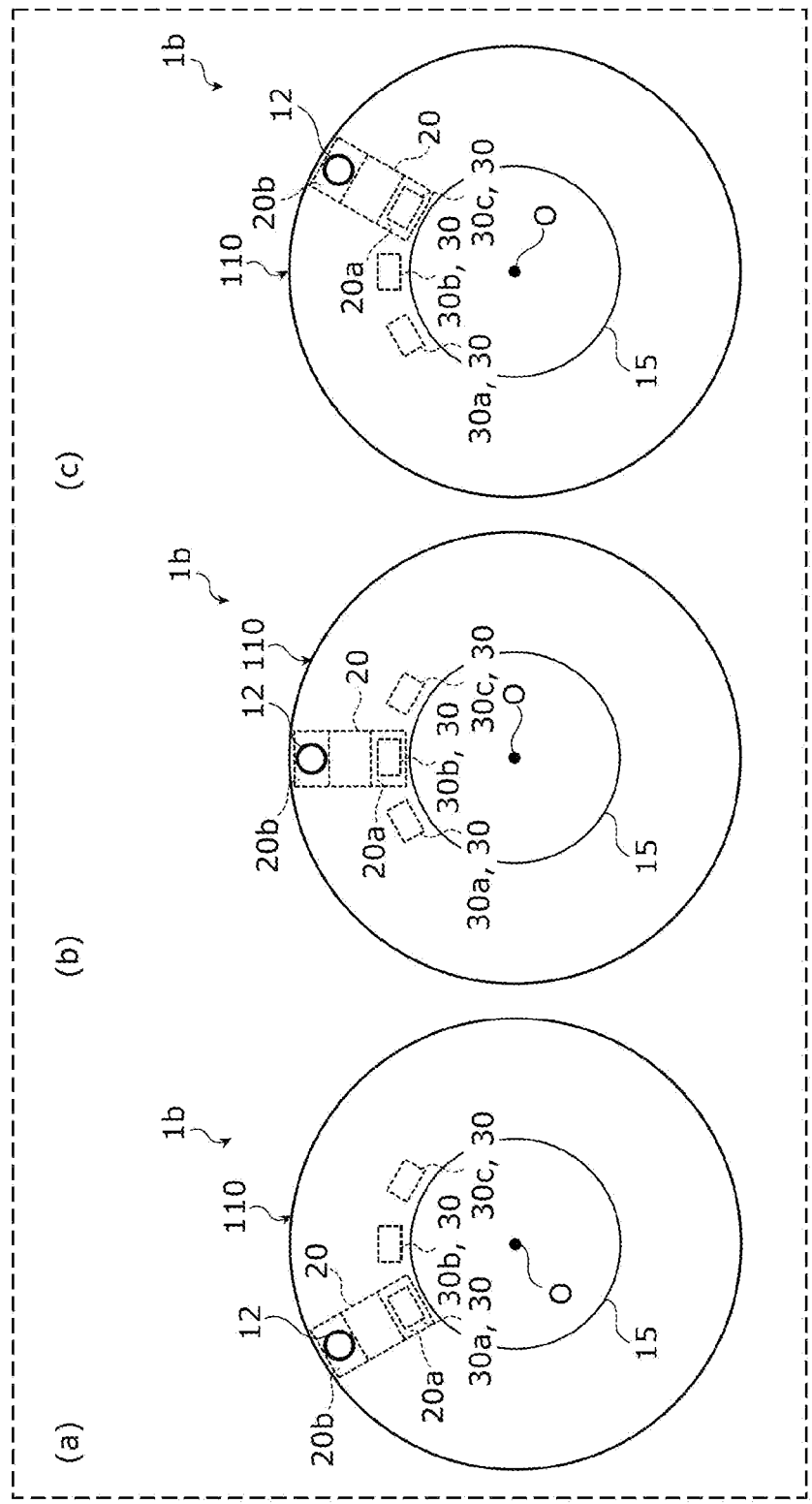

Furthermore, in the above-mentioned embodiment and the variation according to the embodiment, although vehicle switch illumination devices configured to include a rotator in which a pointer is provided are described as examples, these examples are not limiting. For example, as illustrated in FIG. 7, rotator 110 of vehicle switch illumination device 1b need not include a pointer, such as those described the in above-mentioned embodiment and the variation of the embodiment. FIG. 7 is a plan view of vehicle switch illumination device 1b according to another embodiment and the like. Rotator 110 may correspond to the main body in the above-mentioned embodiment and the variation of the embodiment. Rotator 110 may be disc-shaped. In such a configuration, rotator 110 can be gripped by a person's hand and rotated. Pointer indicator 12 may be disposed in rotator 110. Furthermore, light guide 20 may be disposed in rotator 110.

Additionally, forms obtained by various modifications to the above-mentioned embodiment, the variation of the embodiment, and the other embodiment conceivable by those skilled in the art, as well as forms resulting from arbitrary combinations of elements and functions in the embodiments that do not depart from the essence of the present disclosure are intended to be included in the scope of the present disclosure.

The characteristics of the vehicle switch illumination devices that have been described based on the above-mentioned embodiment, the variation of the embodiment, and the other embodiment are described below.

<Technique 1>

A vehicle switch illumination device comprising: a rotator that includes a pointer indicator and is operable by rotation; a first light source; a second light source disposed adjacent to the first light source; and a light guide that includes a light incident surface through which light enters, the light guide guiding the light that enters through the light incident surface to the pointer indicator. The light guided by the light guide exits through the pointer indicator, the light guide rotates in accordance with rotation of the rotator, and the rotator rotates the pointer indicator between a first position and a second position to cause at least one of the first light source or the second light source to oppose the light incident surface.

<Technique 2>

In the vehicle switch illumination device according to Technique 1, when the pointer indicator is located in the first position, the light guide is positioned to cause the light incident surface to oppose the first light source, when the pointer indicator is located between the first position and the second position, the light guide is positioned to cause the light incident surface to oppose the first light source and the second light source, and when the pointer indicator is located in the second position, the light guide is positioned to cause the light incident surface to oppose the second light source.

<Technique 3>

In the vehicle switch illumination device according to Technique 1 or Technique 2, a color of light emitted by the first light source and a color of light emitted by the second light source are different colors.

<Technique 4>

In the vehicle switch illumination device according to any one of techniques 1 to 3, the light incident surface includes: a first surface; and a second surface that is continuous with the first surface and tapered relative to a shape of the first surface.

<Technique 5>

In the vehicle switch illumination device according to any one of techniques 1 to 4, a shape of a portion of the light incident surface located inside of a circumference of a virtual circle and a shape of a portion of the light incident surface located outside of the circumference of the virtual circle are different, the virtual circle being defined by a path in which the light guide rotates.

<Technique 6>

In the vehicle switch illumination device according to any one of techniques 1 to 5, the first light source is disposed along a first circle defined by a center of rotation about which the light guide rotates, and the second light source is disposed along a second circle defined by the center of rotation about which the light guide rotates and having a radius different from a radius of the first circle.

<Technique 7>

In the vehicle switch illumination device according to Technique 4, the first light source is disposed along a first circle defined by a center of rotation about which the light guide rotates, the second light source is disposed along a second circle defined by the center of rotation about which the light guide rotates and having a radius different from a radius of the first circle, the first surface rotates along the first circle in accordance with the rotation of the rotator, and the second surface rotates along the second circle in accordance with the rotation of the rotator.

<Technique 8>

In the vehicle switch illumination device according to any one of techniques 1 to 7, the first light source and the second light source are disposed inside of a circumference of a virtual circle defined by a path in which the pointer indicator rotates.

Further Information about Technical Background to this Application

The disclosure of the following patent application including specification, drawings, and claims is incorporated herein by reference in its entirety: Japanese Patent Application No. 2023-059033 filed on Mar. 31, 2023.

The invention claimed is:

1. A vehicle switch illumination device comprising:
   a rotator that includes a pointer indicator and is operable by rotation;
   a first light source;
   a second light source disposed adjacent to the first light source; and
   a light guide that includes a light incident surface through which light enters, the light guide guiding the light that enters through the light incident surface to the pointer indicator, wherein
   the light guided by the light guide exits through the pointer indicator,
   the light guide rotates in accordance with rotation of the rotator such that a position of the light incident surface changes in accordance with the rotation of the rotator, and
   the rotator rotates the pointer indicator between a first position in which the light incident surface faces the first light source and a second position in which the light incident surface faces the second light source.

2. The vehicle switch illumination device according to claim 1, wherein
   when the pointer indicator is located in the first position, the light guide is positioned to cause the light incident surface to oppose the first light source,
   when the pointer indicator is located between the first position and the second position, the light guide is positioned to cause the light incident surface to oppose the first light source and the second light source, and
   when the pointer indicator is located in the second position, the light guide is positioned to cause the light incident surface to oppose the second light source.

3. The vehicle switch illumination device according to claim 1, wherein
   a color of light emitted by the first light source and a color of light emitted by the second light source are different colors.

4. The vehicle switch illumination device according to claim 1, wherein the light incident surface includes:
  a first surface; and
  a second surface that is continuous with the first surface and tapered relative to a shape of the first surface.

5. The vehicle switch illumination device according to claim 1, wherein
  a shape of a portion of the light incident surface located inside of a circumference of a virtual circle and a shape of a portion of the light incident surface located outside of the circumference of the virtual circle are different, the virtual circle being defined by a path in which the light guide rotates.

6. The vehicle switch illumination device according to claim 4, wherein
  the first light source is disposed along a first circle defined by a center of rotation about which the light guide rotates, and
  the second light source is disposed along a second circle defined by the center of rotation about which the light guide rotates and having a radius different from a radius of the first circle.

7. The vehicle switch illumination device according to claim 4, wherein
  the first light source is disposed along a first circle defined by a center of rotation about which the light guide rotates,
  the second light source is disposed along a second circle defined by the center of rotation about which the light guide rotates and having a radius different from a radius of the first circle,
  the first surface rotates along the first circle in accordance with the rotation of the rotator, and
  the second surface rotates along the second circle in accordance with the rotation of the rotator.

8. The vehicle switch illumination device according to claim 1, wherein
  the first light source and the second light source are disposed inside of a circumference of a virtual circle defined by a path in which the pointer indicator rotates.

9. The vehicle switch illumination device according to claim 1, wherein
  the rotator rotates the pointer indicator to a third position in which the light incident surface faces the first light source and the second light source.

10. The vehicle switch illumination device according to claim 1, wherein
  the rotator rotates so that the light incident surface faces a position between the first light source and the second light source.

* * * * *